US012692405B2

(12) United States Patent
Takaori

(10) Patent No.: US 12,692,405 B2
(45) Date of Patent: Jul. 28, 2026

(54) INKJET INK SET AND INKJET RECORDING APPARATUS

(71) Applicant: KYOCERA Document Solutions Inc., Osaka (JP)

(72) Inventor: Yasuko Takaori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 142 days.

(21) Appl. No.: 18/753,519

(22) Filed: Jun. 25, 2024

(65) Prior Publication Data

US 2025/0002742 A1 Jan. 2, 2025

(30) Foreign Application Priority Data

Jun. 27, 2023 (JP) ................................. 2023-104821

(51) Int. Cl.
| | |
|---|---|
| *C09D 11/54* | (2014.01) |
| *B41J 2/01* | (2006.01) |
| *B41J 2/18* | (2006.01) |
| *B41J 2/38* | (2006.01) |
| *B41J 11/00* | (2006.01) |
| *C09D 11/102* | (2014.01) |
| *C09D 11/30* | (2014.01) |
| *C09D 11/322* | (2014.01) |
| *C09D 11/38* | (2014.01) |
| *C09D 11/40* | (2014.01) |

(52) U.S. Cl.
CPC ................. *C09D 11/54* (2013.01); *B41J 2/01* (2013.01); *B41J 2/18* (2013.01); *B41J 2/38* (2013.01); *B41J 11/002* (2013.01); *B41J*

*11/007* (2013.01); *C09D 11/102* (2013.01); *C09D 11/30* (2013.01); *C09D 11/322* (2013.01); *C09D 11/38* (2013.01); *C09D 11/40* (2013.01)

(58) Field of Classification Search
CPC ..... C09D 11/54; C09D 11/322; C09D 11/102; C09D 11/38; C09D 11/40; C09D 11/30; B41J 2/18; B41J 2/38; B41J 11/002; B41J 11/007; B41J 2/01
See application file for complete search history.

(56) References Cited

U.S. PATENT DOCUMENTS

| | | | | |
|---|---|---|---|---|
| 2006/0071990 A1* | 4/2006 | Hirakawa | .............. | B41J 2/2114 |
| | | | | 347/95 |
| 2007/0212539 A1* | 9/2007 | Yamada | .................. | B32B 27/08 |
| | | | | 428/383 |

(Continued)

FOREIGN PATENT DOCUMENTS

JP 2003-313468 A 11/2003

*Primary Examiner* — Yaovi M Ameh
(74) *Attorney, Agent, or Firm* — Studebaker Brackett PLLC

(57) ABSTRACT

An inkjet ink set includes an undercoat liquid and one or more inkjet inks. The undercoat liquid contains first binder resin particles, a first aqueous medium, and a first surfactant. The one or more inkjet inks each contain a second pigment, second binder resin particles, a second aqueous medium, and a second surfactant. At a temperature of 20° C., a density $\rho 1$ of the undercoat liquid and a density $\rho 2$ of an inkjet ink of the one or more inkjet inks that has the highest density among those of the one or more inkjet inks satisfy a relationship represented by formula (1): $\rho 1 - \rho 2 > 0.05$ g/cm$^3$ ... (1).

13 Claims, 2 Drawing Sheets

(56) References Cited

U.S. PATENT DOCUMENTS

| 2011/0181646 | A1* | 7/2011 | Okuda | ........................ | B41J 2/21 |
| | | | | | 347/14 |
| 2021/0129568 | A1* | 5/2021 | Miyasa | ................ | B41M 5/0023 |

* cited by examiner

INKJET INK SET AND INKJET RECORDING APPARATUS

INCORPORATION BY REFERENCE

The present application claims priority of Japanese Patent Application No. 2023-104821 under 35 U.S.C. § 119, filed on Jun. 27, 2023. The contents of this application are incorporated herein by reference in their entirety.

BACKGROUND

The present disclosure relates to an inkjet ink set and an inkjet recording apparatus.

Ink droplets of inkjet inks of colors ejected onto a non-permeable recording medium during inkjet printing may blend, resulting in color mixing and bleeding. Therefore, inkjet inks used in inkjet printing on non-permeable recording media are required to have pinning property, which refers to the ability of ink droplets ejected to stay in place when landing.

An ink that meets such requirements is proposed, containing a pigment, polyester resin particles with a particle diameter in a range of from 30 to 300 nm, and a water-soluble epoxy compound, for example.

SUMMARY

An inkjet ink set according to an aspect of the present disclosure includes an undercoat liquid, and one or more inkjet inks. The undercoat liquid contains first binder resin particles, a first aqueous medium, and a first surfactant. The one or more inkjet inks each contain a second pigment, second binder resin particles, a second aqueous medium, and a second surfactant. At a temperature of 20° C., a density $\rho 1$ of the undercoat liquid and a density $\rho 2$ of an inkjet ink of the one or more inkjet inks that has the highest density among those of the one or more inkjet inks satisfy a relationship represented by formula (1) below:

$$\rho 1 - \rho 2 > 0.05 \text{ g/cm}^3 \qquad (1)$$

An inkjet recording apparatus according to another aspect of the present disclosure includes: an undercoat liquid, one or more inkjet inks, a conveyance section that conveys a recording medium; an undercoat liquid ejection head that ejects the undercoat liquid onto the recording medium; and one or more recording heads that are placed downstream of the undercoat liquid ejection head in terms of a conveyance direction of the recording medium and that eject the inkjet ink onto at least a part of an area of the recording medium, the area being an area of the recording medium on which the undercoat liquid has been ejected.

DETAILED DESCRIPTION

Figure 1:
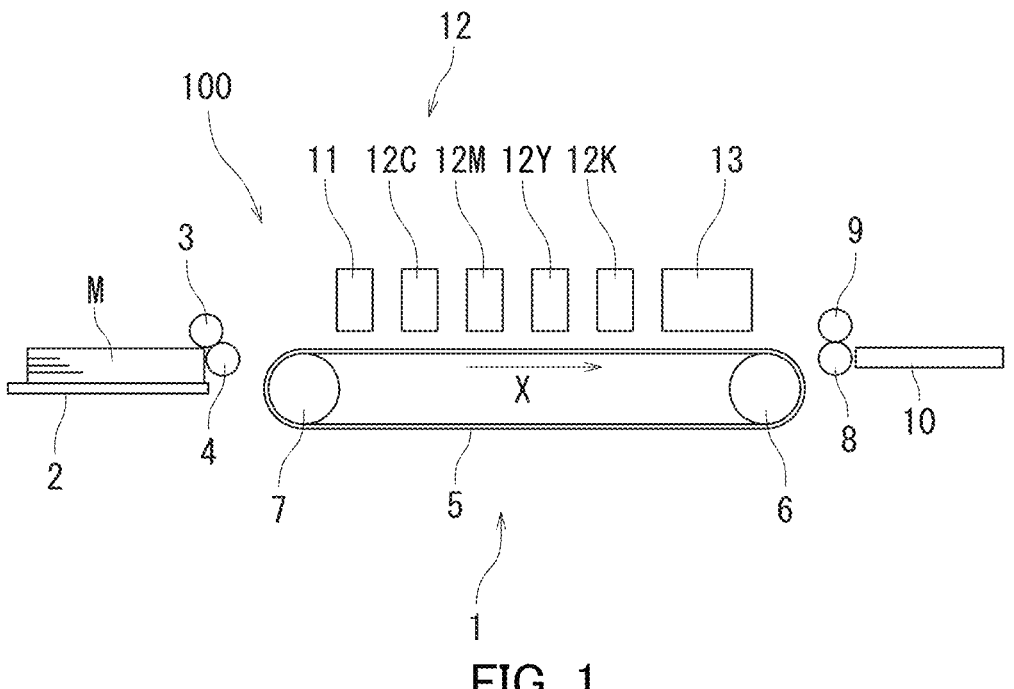
FIG. 1 is a cross-sectional view of an example of an inkjet recording apparatus of a second embodiment according to the present disclosure.

The following describes embodiments of the present disclosure. Note that in the following, measurement values for volume median diameter ($D_{50}$) are values as measured using a dynamic light scattering type particle size distribution analyzer (e.g., "ZETASIZER (registered Japanese trademark) NANO ZS", product of Malvern Instruments Ltd.) unless otherwise stated.

Measurement values for breaking elongation are values as measured in a tensile test using a tensile tester at 25° C. in accordance with the "Japanese Industrial Standards (JIS) K7127-1999".

Measurement values for glass transition temperature (Tg) are values as measured in accordance with the "Japanese Industrial Standards (JIS) K7121-2012" using a differential scanning calorimeter (e.g., "DSC-60", product of Shimazu Corporation) unless otherwise stated. The glass transition temperature (Tg) corresponds to the temperature corresponding to a point of inflection (specifically, an intersection point of an extrapolated baseline and an extrapolated falling line) caused by glass transition in a heat absorption curve (vertical axis: heat flow (DSC signal), horizontal axis: temperature, heating rate: 5° C./min) plotted using the differential scanning calorimeter.

In the present specification, the term "(meth)acryl" is used as a generic term for both acryl and methacryl. Each component described in this specification may be used alone or in combination of two or more.

First Embodiment: Inkjet Ink Set

A first embodiment of the present disclosure relates to an inkjet ink set (also referred to below simply as ink set). The ink set includes an undercoat liquid and one or more inkjet inks (each also referred to below simply as ink). The undercoat liquid contains first binder resin particles, a first aqueous medium, and a first surfactant. The one or more inks each contain a second pigment, second binder resin particles, a second aqueous medium, and a second surfactant. At a temperature of 20° C., a density $\rho 1$ of the undercoat liquid and a density $\rho 2$ of an ink of the inks that has the highest density among those of the one or more inks satisfy a relationship represented by formula (1) as follows:

$$\rho 1 - \rho 2 > 0.05 \text{ g/cm}^3 \qquad (1)$$

The inks of the ink set of the present embodiment include one ink, such as a black ink. Alternatively, the inks of the ink set of the present embodiment is a combination of multiple types of inks, for example. For example, the combination is a combination of four colors of ink that includes a cyan ink containing a cyan pigment, a yellow ink containing a yellow pigment, a magenta ink containing a magenta pigment, and a black ink containing a black pigment. The undercoat liquid may be an ink (e.g., a white ink containing a white pigment) further containing a first pigment, or an undercoat liquid (undercoat liquid other than the ink) containing no pigment. The undercoat liquid can be applied to a recording medium through ejection by the head of an inkjet recording apparatus, or through for example brushing, spraying, or bar coating.

When using the ink set of the present embodiment for image formation, a recording medium undergoes an undercoating treatment at first by applying the undercoat liquid to an image formation area of the recording medium. Then, the undercoated recording medium is subjected to image formation by ejecting the ink. When the ink set of the present embodiment includes a plurality of the inks, an image with multiple colors (e.g., a color image) is formed in image formation by ejecting the inks in a predetermined order.

The ink set of the present embodiment is suitable for image formation on non-absorbent recording media (especially flexible packaging). Compared to absorbent recording media such as plain paper, the non-absorbent recording media exhibit low ink absorbency. The absorption amount of an aqueous medium for the non-absorbent recording media is no greater than 1.0 g/m$^2$, for example. Examples of the non-absorbent recording media include resin recording media, metal recording media, and glass recording media. Examples of the resin recording media include resin sheets and resin films. Preferably, the resin contained in the resin recording media is a thermoplastic resin. Specific examples of the resins include polyethylene, polypropylene, polyvinyl chloride, and polyethylene terephthalate (PET). Examples of resin recording media include biaxially oriented polypropylene film (OPP film) and PET film. When using the ink set of the present embodiment for image formation on a resin recording medium, the surface (printing surface) of the recording medium may be subjected to a corona discharge treatment.

The ink set of the present embodiment is preferably used in front printing. Here, the front printing, when printing on a transparent recording medium, refers to printing on the front side (the side that is visible to viewers) of the transparent recording medium. When viewers view a recording medium with front printing performed thereon, the positional relationship "the viewers, an image, and the recording medium" is established and the viewers directly view the image.

Note that reverse printing, when printing on a transparent recording medium, refers to printing on the back side (the side opposite to the side that is visible to viewers) of the transparent recording medium. When viewers view a recording medium with reverse printing performed thereon, the positional relationship "the viewers, the recording medium, and an image" is established and the viewers view the image through the recording medium.

The ink set of the present embodiment, having the features described above, exhibits excellent pinning property. The reasons why the ink set of the present embodiment achieves the effects described above are inferred as follows. The ink set of the present embodiment satisfies formula (1). That is, the density of the undercoat liquid is higher than those of the inks. Ink droplets ejected onto a recording medium, which has undergone undercoating using an undercoat liquid with such high density, hardly spread from their landing points. Moreover, the inks and the undercoat liquid, both included in the ink set of the present embodiment and containing binder resin particles, further effectively inhibit the phenomenon of ink droplets spreading from their landing points. Therefore, the ink set of the present embodiment exhibits excellent pinning property. The ink set of the present embodiment is further described in detail below.

At a temperature of 20° C., the density ρ1 of the undercoat liquid and the density ρ2 of the ink of the inks that has the highest density among those of the inks satisfy the relationship represented by formula (1). Preferably, the density ρ1 and the density ρ2 satisfy formula (1a). The ink set of the present embodiment can exhibit excellent pinning property when the density ρ1 and the density ρ2 satisfy formula (1) (especially satisfy formula (1a)).

$$\rho1 - \rho2 > 0.05 \text{ g/cm}^3 \qquad (1)$$

$$0.07 \text{ g/cm}^3 < \rho1 - \rho2 < 0.13 \text{ g/cm}^3 \qquad (1a)$$

[Undercoat Liquid]

The undercoat liquid contains first binder resin particles, a first aqueous medium, and a first surfactant. Preferably, the undercoat liquid further contains a first pigment. When using the ink set of the present embodiment, which includes the undercoat liquid further containing the first pigment, for image formation on a transparent recording medium, the images can have a high concealment rate. In this case, the undercoat liquid may further contain a pigment coating resin.

At the temperature of 20° C., the density ρ1 of the undercoat liquid is preferably at least 1.10 g/cm$^3$ and no greater than 1.20 g/cm$^3$, and more preferably at least 1.12 g/cm$^3$ and no greater than 1.16 g/cm$^3$. Setting the density ρ1 of the undercoat liquid to at least 1.10 g/cm$^3$ can allow the ink set of the present embodiment to exhibit further excellent pinning property. Setting the density ρ1 of the undercoat liquid to no greater than 1.20 g/cm$^3$ can allow the undercoat liquid to exhibit excellent ejection stability.

(First Binder Resin Particles)

The first binder resin particles are dispersed in the first aqueous medium. The first binder resin particles function as a binder in an image formed with the undercoat liquid, optimizing fixability of pigments (e.g., the first pigment and the second pigment) to the recording medium.

The first binder resin particles have a breaking elongation at 25° C. of preferably no greater than 60%, more preferably at least 1% and no greater than 20%, and further preferably at least 2% and no greater than 5%. The first binder resin particles with a breaking elongation at 25° C. of no greater than 60% can optimize adhesion and scratch resistance of images formed on a recording medium using the ink set of the present embodiment.

The first binder resin particles have a volume median diameter of preferably at least 5 nm and no greater than 300 nm, more preferably at least 100 nm and no greater than 250 nm, and further preferably at least 160 nm and no greater than 240 nm. Setting the first binder resin particles to have a volume median diameter of preferably at least 5 nm and no greater than 300 nm can optimize dispersion stability of the first binder resin particles in the first aqueous medium.

The resin (also referred to below as first binder resin) contained in the first binder resin particles has a glass transition point of preferably at least 20° C. and no greater than 90° C., and more preferably at least 30° C. and no greater than 45° C. The first binder resin with a glass transition point of at least 20° C. can further optimize ejection stability of the undercoat liquid. The first binder resin with a glass transition point of no greater than 90° C. can further optimize adhesion of images formed with the ink set of the present embodiment.

The first binder resin particles have a percentage content of at least 3.0% by mass and no greater than 20.0% by mass in the undercoat liquid, and more preferably at least 3.0% by mass and no greater than 8.0% by mass, or at least 12.0% by mass and no greater than 17.0% by mass. When the first binder resin particles have a percentage content of at least 3.0% by mass, the ink set of the present embodiment can exhibit further excellent pinning property, thereby optimizing adhesion and scratch resistance of images formed on a recording medium. The first binder resin particles with a percentage content of no greater than 20.0% by mass can further optimize ejection stability of the undercoat liquid.

When the undercoat liquid further contains a first pigment, the total percentage content of the first pigment and the first binder resin particles is preferably at least 12.0% by mass and no greater than 20.0% by mass in the undercoat liquid, and more preferably at least 15.0% by mass and no greater than 18.0% by mass. When the undercoat liquid does not contain the first pigment, the first binder resin particles have a percentage content of preferably at least 10.0% by mass and no greater than 18.0% by mass in the undercoat liquid, and more preferably at least 12.0% by mass and no greater than 17.0%.

Examples of the first binder resin particles include urethane resin particles, acrylic resin particles, polyolefin resin particles, and polyester resin particles, and urethane resin particles are preferable. Urethane resin particles contain a urethane resin. The urethane resin has a percentage content of preferably at least 80.0% by mass in the urethane resin particles, more preferably at least 90% by mass, and further preferably at least 100% by mass.

The urethane resin is a copolymer of monomers containing polyisocyanate and a diol compound or a bisphenol compound. An example of polyisocyanate is diisocyanate. Examples of diisocyanate include aliphatic diisocyanate, cycloaliphatic diisocyanate, and aromatic diisocyanate.

(First Aqueous Medium)

The first aqueous medium is a medium containing water. The first aqueous medium may function as either a solvent or a dispersion medium. Specific examples of the first aqueous medium include an aqueous medium containing water and a water-soluble organic solvent.

The water has a percentage content of preferably at least 50.0% by mass and no greater than 85.0% by mass in the undercoat liquid, and more preferably at least 70.0% by mass and no greater than 78.0% by mass.

Examples of the water-soluble organic solvent in the undercoat liquid include glycol compounds, glycol ether compounds, lactam compounds, nitrogen-containing compounds, acetate compounds, thiodiglycol, glycerin and dimethyl sulfoxide.

Examples of the glycol compounds include ethylene glycol, 1,3-propanediol, propylene glycol, 1,2-pentanediol, 1,5-pentanediol, 1,2-octanediol, 1,8-octanediol, 3-methyl-1,3-butanediol, 3-methyl-1,5-pentanediol, diethylene glycol, triethylene glycol, and tetraethylene glycol.

Examples of the glycol ether compounds include diethylene glycol diethyl ether (diethyl diglycol), diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether. A preferable glycol ether compound is diethylene glycol monobutyl ether or triethylene glycol monobutyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

The water-soluble organic solvent in the undercoat liquid is preferably a glycol ether compound, and more preferably diethylene glycol monobutyl ether or triethylene glycol monobutyl ether.

The water-soluble organic solvent has a percentage content of preferably at least 1.0% by mass and no greater than 25.0% by mass in the undercoat liquid, and more preferably at least 5.0% by mass and no greater than 10.0% by mass.

The total percentage content of the water and the glycol ether compound is preferably at least 90% by mass in the first aqueous medium, more preferably at least 99% by mass, and further preferably at least 100% by mass.

Preferably, the first aqueous medium contains only water and diethylene glycol monobutyl ether or contains only water and triethylene glycol monobutyl ether.

(First Surfactant)

The first surfactant optimizes compatibility and dispersion stability of each component contained in the undercoat liquid. The first surfactant also imparts the undercoat liquid with wettability to recording media. The first surfactant in the undercoat liquid is preferably a nonionic surfactant.

Examples of the nonionic surfactant in the undercoat liquid include acetylene glycol surfactants (surfactants containing an acetylene glycol compound), silicone surfactants (surfactants containing a silicone compound), and fluorine surfactants (surfactants containing fluorine resin or a fluorine-containing compound). Examples of the acetylene glycol surfactants include ethylene oxide adducts of acetylene glycol and propylene oxide adducts of acetylene glycol. The undercoat liquid preferably contains a silicone surfactant.

The first surfactant has a percentage content of preferably at least 0.05% by mass and no greater than 2.0% by mass in the undercoat liquid, and more preferably at least 0.1% by mass and no greater than 0.5% by mass.

(First Pigment)

The first pigment constitutes the first pigment particles together with a pigment coating resin, for example. The first pigment particles each include a core containing the first pigment and the pigment coating resin covering the core, for example. The first pigment particles are dispersed in the first aqueous medium, for example.

As described above, the undercoat liquid is preferably a white ink. In this case, the first pigment is a white pigment. Alternatively, the undercoat liquid may be a color ink. In this case, the first pigment is a color pigment.

Examples of the white pigment include zinc white, titanium oxide, antimony white, zinc sulfide, barite powder, barium carbonate, clay, silica, white carbon, talc, calcium carbonate, mica, kaolin, and alumina white. Titanium oxide is preferable for the white pigment.

Examples of the color pigment include yellow pigments, orange pigments, red pigments, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, more specifically 15:3). Examples of the violet pigments include C.I. Pigment Violet (19, 23, or 33). Examples of the black pigments include C.I. Pigment Black (7).

The first pigment particles have a volume median diameter of preferably at least 10 nm and no greater than 300 nm, and more preferably at least 40 nm and no greater than 120 nm. The ink set of the present embodiment can readily form images with desired image density by setting the volume median diameter of the first pigment particles to at least 10 nm. The undercoat liquid can exhibit excellent preservation stability by containing the first pigment particles with a volume median diameter of no greater than 300 nm.

The first pigment has a percentage content of preferably at least 8.0% by mass and no greater than 25.0% by mass in the undercoat liquid, and more preferably at least 10.0% by mass and no greater than 15.0% by mass. The undercoat liquid can form images with a high opacity by containing the first pigment with a percentage content of at least 8.0% by mass. The undercoat liquid can exhibit excellent preservation stability by containing the first pigment with a percentage content of no greater than 25.0% by mass.

(Pigment Coating Resin)

The pigment coating resin attaches to the surface of the first pigment, thereby optimizing dispersion stability of the first pigment in the first aqueous medium. Note that a portion of the pigment coating resin may be free in the first aqueous medium without attaching to the surface of the first pigment. Examples of the pigment coating resin include polyether resin, (meth)acrylic resin, styrene-(meth)acrylic resin, and styrene-maleic acid resin.

The pigment coating resin has a percentage content of preferably at least 0.1% by mass and no greater than 5.0% by mass in the undercoat liquid, and more preferably at least 0.5% by mass and no greater than 2.0% by mass. Setting the pigment coating resin to have a percentage content of at least 0.1% by mass can further optimize dispersion stability of the first pigment in the first aqueous medium. Setting the pigment coating resin to have a percentage content of no greater than 5.0% by mass can further optimize ejection stability of the undercoat liquid.

The undercoat liquid has a ratio of the mass of the pigment coating resin to the mass of the first pigment of preferably at least 0.10 and no greater than 0.50, and more preferably at least 0.20 and no greater than 0.30. Setting the ratio of the mass of the pigment coating resin to the mass of the first pigment to at least 0.10 and no greater than 0.50 can further optimize dispersion stability of the first pigment in the first aqueous medium.

(Optional Component)

The undercoat liquid may further contain known additives (e.g., a solution stabilizer, an anti-drying agent, an antioxidant, a viscosity modifier, a pH adjuster, and an antifungal agent) as necessary.

(Undercoat Liquid Production Method)

The undercoat liquid can be produced by mixing a first binder resin particle dispersion that contains the first binder resin particles, the first aqueous medium, and an optional component (e.g., a first pigment dispersion containing the first pigment surfactant) added as necessary, for example. In undercoat liquid production, uniform mixing of each component may be followed by removal of foreign matter and coarse particles using a filter (e.g., a filter with a pore size of no greater than 5 μm).

(Preferable Composition)

Preferably, the undercoat liquid has one of Compositions 1 to 9 shown in Table 1. Note that, in Table 1, urethane resin particles a have a breaking elongation of at least 1% and no greater than 5% and a volume median diameter of at least 180 nm and no greater than 220 nm. The urethane resin particles a contain a urethane resin with a glass transition point of at least 35° C. and no greater than 42° C. Urethane resin particles b have a breaking elongation of at least 45% and no greater than 55% and a volume median diameter of at least 8 nm and no greater than 12 nm. The urethane resin particles b contain a urethane resin with a glass transition point of at least 72° C. and no greater than 78° C. Table 1 shows preferable numerical ranges of the percentage contents [% by mass] for each component. For example, the numerical range of "10.0-13.0", which is a percentage content range of a white pigment in Composition 1, indicates that the white pigment is contained in a range of at least 10.0% by mass to no greater than 13.0% by mass. Abbreviations used in Table 1 are as follows.

GEGMBE: diethylene glycol monobutyl ether
TEGMBE: triethylene glycol monobutyl ether

TABLE 1

| | | Composition 1 | Composition 2 | Composition 3 | Composition 4 | Composition 5 |
|---|---|---|---|---|---|---|
| % by mass | White pigment | 10.0-13.0 | 10.0-13.0 | — | — | — |
| | Pigment coating resin | 1.0-2.0 | 1.0-2.0 | — | — | — |
| | Urethane resin particles a | 4.5-5.5 | 4.5-5.5 | 14.0-16.0 | 14.0-16.0 | 10.0-12.0 |
| | Urethane resin particles b | — | — | — | — | — |
| | GEGMBE | — | — | — | — | — |
| | TEGMBE | 7.0-9.0 | 7.0-9.0 | 7.0-9.0 | 7.0-9.0 | 7.0-9.0 |
| | First surfacant | 0.2-0.4 | 0.2-0.4 | 0.2-0.4 | 0.2-0.4 | 0.2-0.4 |
| Ion exchange water | | Rest | | | | |
| Total | | 100.0 | | | | |

| | | Composition 6 | Composition 7 | Composition 8 | Composition 9 |
|---|---|---|---|---|---|
| % by mass | White pigment | — | 10.0-13.0 | 10.0-13.0 | 10.0-13.0 |
| | Pigment coating resin | — | 1.0-2.0 | 1.0-2.0 | 1.0-2.0 |
| | Urethane resin particles a | — | 4.5-5.5 | 4.5-5.5 | 4.5-5.5 |
| | Urethane resin particles b | 14.0-16.0 | — | — | — |

TABLE 1-continued

| | | | | |
|---|---|---|---|---|
| GEGMBE | — | 7.0-9.0 | — | 7.0-9.0 |
| TEGMBE | 7.0-9.0 | — | 7.0-9.0 | — |
| First surfacant | 0.2-0.4 | 0.2-0.4 | 0.2-0.4 | 0.2-0.4 |
| Ion exchange water | | Rest | | |
| Total | | 100.0 | | |

[Ink]

The ink contains a second pigment, second binder resin particles, a second aqueous medium, and a second surfactant. Preferably, the ink further contains a pigment coating resin. As described above, the ink set of the present embodiment includes one or more inks.

At a temperature of 20° C., the density ρ2 of the ink of the inks that has the highest density among those of the inks is preferably at least 1.00 g/cm$^3$ and no greater than 1.09/cm$^3$, and more preferably at least 1.02 g/cm$^3$ and no greater than 1.06 g/cm$^3$ The ink set of the present embodiment can exhibit further excellent pinning property by setting the density ρ2 of the ink to at least 1.00 g/cm$^3$ and no greater than 1.09 g/cm$^3$.

(Second Pigment)

The second pigment in the ink constitutes the second pigment particles together with the pigment coating resin, for example. The second pigment particles each include a core containing the second pigment and a pigment coating resin covering the core, for example. The second pigment particles are dispersed in the second aqueous medium, for example.

As described above, each of the inks is preferably a color ink. In this case, the second pigment is a color pigment. Alternatively, the ink may be a white ink. In this case, the second pigment is a white pigment. Examples of the white pigment and color pigment for the ink can be the same as those for the undercoat liquid.

The second pigment particles have a volume median diameter of preferably at least 10 nm and no greater than 300 nm, and more preferably at least 70 nm and no greater than 130 nm. The ink set of the present embodiment can readily form images with desired image density by setting the volume median diameter of the second pigment particles to at least 10 nm. The ink can exhibit excellent preservation stability by containing the second pigment particles with a volume median diameter of no greater than 300 nm.

The second pigment has a percentage content of preferably at least 1.0% by mass and no greater than 8.0% by mass in the ink, and more preferably at least 1.5% by mass and no greater than 3.0% by mass. The ink set of the present embodiment can form images with desired image density by setting the percentage content of the second pigment in the ink to be at least 1.0% by mass. The ink can exhibit excellent preservation stability by containing the second pigment with a percentage content of no greater than 8.0% by mass.

(Pigment Coating Resin)

The pigment coating resin attaches to the surface of the second pigment, thereby optimizing dispersion stability of the second pigment in the second aqueous medium. Note that a portion of the pigment coating resin may be free in the second aqueous medium without attaching to the surface of the second pigment. Examples of the pigment coating resin include polyether resin, (meth)acrylic resin, styrene-(meth) acrylic resin, and styrene-maleic acid resin.

The pigment coating resin has a percentage content of preferably at least 0.1% by mass and no greater than 4.0% by mass in the ink, and more preferably at least 0.5% by mass and no greater than 1.5% by mass. Setting the percentage content of the pigment coating resin to at least 0.1% by mass can further optimize dispersion stability of the second pigment in the second aqueous medium. The ink containing the pigment coating resin with a percentage content of no greater than 4.0% by mass can exhibit optimized ejection stability.

[Second Binder Resin Particles]

The second binder resin particles are dispersed in the second aqueous medium. The second binder resin particles function as a binder in an image formed with the ink set of the present embodiment, optimizing fixability of the second pigment to a recording medium. The second binder resin particles can also impart images, which are formed with the ink set of the present embodiment, with scratch resistance.

The second binder resin particles have a breaking elongation at 25° C. of preferably at least 1% and no greater than 100%, and more preferably at least 40% and no greater than 60%. The second binder resin particles with a breaking elongation at 25° C. of no greater than 100% can optimize adhesion and scratch resistance of images formed on a recording medium with the ink set of the present embodiment.

The second binder resin particles have a volume median diameter of preferably at least 5 nm and no greater than 150 nm, more preferably at least 5 nm and no greater than 40 nm, and further preferably at least 5 nm and no greater than 20 nm. Setting the volume median diameter of the second binder resin particles to at least 5 nm and no greater than 150 nm can optimize dispersion stability of the second binder resin particles in the second aqueous medium.

The resin (also referred to below as second binder resin) contained in the second binder resin particles has a glass transition point of preferably at least 45° C. and no greater than 90° C., and more preferably at least 70° C. and no greater than 80° C. The second binder resin with a glass transition point of at least 45° C. can further optimize ejection stability of the ink. The second binder resin with a glass transition point of no greater than 90° C. can further optimize adhesion of images formed with the ink set of the present embodiment.

Examples of the second binder resin particles include urethane resin particles, polyolefin resin particles, and polyester resin particles, and urethane resin particles or polyester resin particles are preferable. When the second binder resin particles contain particles of at least one of urethane resin and polyester resin, the breaking elongation of the second binder resin particles is preferably no greater than 60%. Details of urethane resin particles in the ink are the same as those of in the undercoat liquid, duplicate descriptions are omitted. Polyester resin particles contain a polyester resin. The polyester resin has a percentage content of preferably at least 80% by mass in the polyester resin particles, more preferably at least 90% by mass, and further preferably at least 100% by mass.

The polyester resin is obtained by condensation polymerization of at least one polyhydric alcohol and at least one polybasic carboxylic acid. Examples of the polyhydric alcohol for synthesizing the polyester resin include dihydric alcohols (e.g., diol compounds and bisphenol compounds) and tri- or higher-hydric alcohols. Examples of the polybasic carboxylic acid for synthesizing the polyester resin include dibasic carboxylic acids and tri- or higher-basic carboxylic acids. Note that a polybasic carboxylic acid derivative (e.g., an anhydride of a polybasic carboxylic acid and a halide of a polybasic carboxylic acid) that can form an ester bond by condensation polymerization may be used instead of the polybasic carboxylic acid.

The second binder resin particles have a percentage content of preferably at least 2.0% by mass and no greater than 12.0% by mass in the ink, and more preferably at least 4.0% by mass and no greater than 6.0% by mass. Images formed with the ink set of the present embodiment can exhibit further optimized scratch resistance and adhesion to the recording medium by setting the percentage content of the second binder resin particles to at least 2.0% by mass. The second binder resin particles with a percentage content of no greater than 12.0% by mass can further optimize ejection stability of the ink.

[Second Aqueous Medium]

The second aqueous medium is a medium containing water. The second aqueous medium may function as either a solvent or a dispersion medium. Specific examples of the second aqueous medium include an aqueous medium containing water and a water-soluble organic solvent.

The water has a percentage content of preferably at least 40.0% by mass and no greater than 80.0% by mass in the ink, and more preferably at least 60.0% by mass and no greater than 70.0% by mass.

Examples of the water-soluble organic solvent for the ink are the same as those listed as the examples for the undercoat liquid. The water-soluble organic solvent in the ink is preferably a glycol compound or a glycol ether compound, and more preferably propylene glycol, 1,3-propanediol, 3-methyl-1,3-butanediol, or triethylene glycol monobutyl ether.

The water-soluble organic solvent has a percentage content of preferably at least 10.0% by mass and no greater than 45.0% by mass in the ink, and more preferably at least 24.0% by mass and no greater than 32.0% by mass.

The total percentage of the water, the glycol compound, and the glycol ether compound is preferably at least 90.0% by mass in the second aqueous medium, more preferably at least 99.0% by mass, and further preferably at least 100%.

Preferably, the second aqueous medium contains: only water, propylene glycol, and triethylene glycol monobutyl ether; only water, 1,3-propanediol, and triethylene glycol monobutyl ether; only water, propylene glycol, and 3-methyl-1,3-butanediol; or only water and triethylene glycol monobutyl ether.

(Second Surfactant)

The second surfactant optimizes compatibility and dispersion stability of each component contained in the ink. Examples of the second surfactant for the ink are the same as the first surfactant contained in the undercoat liquid in terms of type and percentage content. The second surfactant is preferably a silicone surfactant. That is, the first surfactant and the second surfactant each are preferably a silicone surfactant.

The second surfactant has a percentage content of preferably at least 0.05% by mass and no greater than 2.0% by mass in the ink, and more preferably at least 0.1% by mass and no greater than 0.5% by mass.

[Optional Component]

The ink may further contain known additives (e.g., a solution stabilizer, an anti-drying agent, an antioxidant, a viscosity modifier, a pH adjuster, and an antifungal agent) as necessary.

[Ink Production Method]

The ink can be produced by mixing a second pigment dispersion that contains the second pigment, a second binder resin particle dispersion that contains the second binder resin particles, the second aqueous medium, the second surfactant, and an optional component (e.g., additives) added as necessary, for example. In ink production, uniform mixing of each component may be followed by removal of foreign matter and coarse particles using a filter (e.g., a filter with a pore size of no greater than 5 μm).

(Preferable Composition)

Preferably, the ink has one of Compositions 10 to 15 shown in Table 2. Note that, in Table 2, urethane resin particles b is the same as that of shown in Table 1. Urethane resin particles c have a breaking elongation of at least 2% and no greater than 6% and a volume median diameter of at least 25 nm and no greater than 35 nm. The urethane resin particles c contain a urethane resin with a glass transition point of at least 75° C. and no greater than 81° C. PEs particles a have a breaking elongation of at least 8% and no greater than 12% and a volume median diameter of at least 75 nm and no greater than 95 nm. The PEs particles a contain a polyester resin with a glass transition point of at least 62° C. and no greater than 68° C. Table 2 shows preferable numerical ranges of the percentage contents [% by mass] for each component. For example, the numerical range of "1.8-2.4", which is a percentage content range of a color pigment in Composition 10, indicates that the color pigment is contained in a range of at least 1.8% by mass to no greater than 2.4% by mass. Abbreviations used in Table 2 are as follows.

TEGMBE: triethylene glycol monobutyl ether
MBD: 3-methyl-1,3-butanediol

TABLE 2

| | | Compositions | | | | | |
| --- | --- | --- | --- | --- | --- | --- | --- |
| | | 10 | 11 | 12 | 13 | 14 | 15 |
| % by mass | Color pigment | 1.8-2.4 | 1.8-2.4 | 1.8-2.4 | 1.8-2.4 | 1.8-2.4 | 1.8-2.4 |
| | Pigment coating resin | 0.6-1.2 | 0.6-1.2 | 0.6-1.2 | 0.6-1.2 | 0.6-1.2 | 0.6-1.2 |
| | Urethane resin particles b | 4.5-5.5 | — | 4.5-5.5 | 4.5-5.5 | — | 4.5-5.5 |

TABLE 2-continued

| | Compositions | | | | | |
| | 10 | 11 | 12 | 13 | 14 | 15 |
|---|---|---|---|---|---|---|
| Urethane resin particles c | — | 4.5-5.5 | — | — | — | — |
| PEs particles a | — | — | — | — | 4.5-5.5 | — |
| Propylene glycol | 18.0-22.0 | 18.0-22.0 | — | 18.0-22.0 | 18.0-22.0 | — |
| TEGMBE | 7.0-9.0 | 7.0-9.0 | 7.0-9.0 | — | 7.0-9.0 | — |
| 1,3-Propanediol | — | — | 18.0-22.0 | — | — | 18.0-22.0 |
| MBD | — | — | — | 7.0-9.0 | — | 7.0-9.0 |
| Second surfactant | 0.1-0.5 | 0.1-0.5 | 0.1-0.5 | 0.1-0.5 | 0.1-0.5 | 0.1-0.5 |
| Ion exchange water | | | Rest | | | |
| Total | | | 100.0 | | | |

Second Embodiment: Inkjet Recording Apparatus

A second embodiment of the present disclosure relates to an inkjet recording apparatus. The inkjet recording apparatus of the present embodiment includes: an undercoat liquid; one or more inks; a conveyance section that conveys a recording medium; an undercoat liquid ejection head that ejects the undercoat liquid onto a recording medium; and one or more recording heads that are placed downstream of the undercoat liquid ejection head in terms of a conveyance direction of the recording medium (also refers to below as sheet conveyance direction) and that eject the ink onto at least a part of an area of the recording medium, the area being an area of the recording medium onto which the undercoat liquid has been ejected. The undercoat liquid contains first binder resin particles, a first aqueous medium, and a first surfactant. The one or more inks each contain a second pigment, second binder resin particles, a second aqueous medium, and a second surfactant. At a temperature of 20° C., a density $\rho 1$ of the undercoat liquid and a density $\rho 2$ of an ink of the one or more inks that has the highest density among those of the inks satisfy a relationship represented by formula (1) below:

$$\rho 1 - \rho 2 > 0.05 \text{ g/cm}^3 \qquad (1)$$

The recording medium is preferably a non-absorbent recording medium. The undercoat liquid and ink included in the inkjet recording apparatus according to the present embodiment are the same as those included in the ink set according to the first embodiment. Therefore, the inkjet recording apparatus can be described as the one that includes the ink set according to the first embodiment. Note that, details about the ink set are omitted as they have already been described in the first embodiment. The inkjet recording apparatus of the present embodiment, which uses the ink set according to the first embodiment, exhibits excellent pinning property.

With reference to the accompanying drawings, the inkjet recording apparatus of the present disclosure is described below. Note that the drawings schematically illustrate elements of configuration to facilitate understanding. Properties such as the size and number of the elements of configuration illustrated in the drawings may differ from actual ones thereof to facilitate preparation of the drawings.

FIG. 1 is a diagram illustrating main components of an inkjet recording apparatus 100, which is an example of the inkjet recording apparatus of the present embodiment. As illustrated in FIG. 1, the inkjet recording apparatus 100 mainly includes a conveyance section 1, line heads, and a drying device 13. The line heads include an undercoat liquid ejection head 11 and recording heads 12. The inkjet recording apparatus 100 further includes a sheet feed tray 2, a sheet feed roller 3, a sheet feed driven roller 4, a conveyor belt 5, a belt drive roller 6, a belt driven roller 7, an ejection roller 8, an ejection driven roller 9, and an exit tray 10. The conveyor belt 5, the belt drive roller 6, and the belt driven roller 7 constitute a part of the conveyance section 1. The sheet feed tray 2 is provided at the left end of the inkjet recording apparatus 100 in FIG. 1. The sheet feed tray 2 accommodates recording medium sheets M. The sheet feed roller 3 and the sheet feed driven roller 4 are provided at one end of the sheet feed tray 2. The sheet feed roller 3 picks up the accommodated recording medium sheets M sequentially one by one, starting from the uppermost sheet, and conveys each of the recording medium sheets M to the conveyor belt 5. The sheet feed driven roller 4 is pressed against the sheet feed roller 3 to be driven rotationally.

The conveyor belt 5 is provided in a rotatable manner downstream (rightward in FIG. 1) of the sheet feed roller 3 and the sheet feed driven roller 4 in terms of a sheet conveyance direction. The conveyor belt 5 is wound between the belt drive roller 6 and the belt driven roller 7. The belt drive roller 6 is provided downstream of the belt driven roller 7 in terms of the sheet conveyance direction. The belt drive roller 6 drives the conveyor belt 5. The belt driven roller 7 is provided upstream of the belt drive roller 6 in terms of the sheet conveyance direction. The belt driven roller 7 is rotationally driven following the belt drive roller 6 through the conveyor belt 5. When the belt drive roller 6 is rotationally driven in the clockwise direction in FIG. 1, the recording medium sheet M is conveyed in a sheet conveyance direction indicated by the arrow X in FIG. 1.

The ejection roller 8 and the ejection driven roller 9 are provided downstream of the conveyor belt 5 in terms of the sheet conveyance direction. The ejection roller 8 is rotationally driven in the clockwise direction in FIG. 1 to eject the recording medium sheet M with an image formed thereon out of the apparatus casing. The ejection driven roller 9 is pressed against the upper part of the ejection roller 8 to be driven rotationally. The exit tray 10 is provided downstream of the ejection roller 8 and the ejection driven roller 9 in terms of the sheet conveyance direction. The recording medium sheets M ejected out of the apparatus casing are stacked on the exit tray 10.

The undercoat liquid ejection head 11 is provided above the conveyor belt 5. The undercoat liquid ejection head 11 ejects the undercoat liquid onto an image formation area (e.g., the entire surface) of the recording medium sheet M conveyed on the conveyor belt 5. In the manner described above, the image formation area of the recording medium sheet M undergoes undercoating by the undercoat liquid ejection head 11.

The undercoat liquid ejection head 11 is preferably a circulation type head. As described in the first embodiment, the undercoat liquid tends to contain a significant amount of solid (e.g., the first binder resin particles and the first pigment) due to the need for high density. Ejecting the undercoat liquid with a typical head (non-circulation type head) may result in agglomeration of the solid in the undercoat liquid. By contrast, using a circulation type head as the undercoat liquid ejection head 11 can effectively inhibit agglomeration of solid in the undercoat liquid.

The recording heads 12 are provided downstream of the undercoat liquid ejection head 11 in terms of the sheet conveyance direction. The recording heads 12 include a cyan ink recording head 12C, a magenta ink recording head 12M, a yellow ink recording head 12Y, and a black ink recording head 12K. The cyan ink recording head 12C, the magenta ink recording head 12M, the yellow ink recording head 12Y, and the black ink recording head 12K are arranged above the conveyor belt 5 in the stated order from upstream to downstream in terms of the sheet conveyance direction of the recording medium sheet M. The cyan ink recording head 12C, the magenta ink recording head 12M, the yellow ink recording head 12Y, and the black ink recording head 12K each are supported at a height where the distance to the upper surface of the conveyor belt 5 is a predetermined length. The cyan ink recording head 12C, the magenta ink recording head 12M, the yellow ink recording head 12Y, and the black ink recording head 12K each perform image formation on the recording medium sheet M, which has undergone undercoating and which is conveyed on the conveyor belt 5. The cyan ink recording head 12C, the magenta ink recording head 12M, the yellow ink recording head 12Y, and the black ink recording head 12K accommodate mutually different color inks (cyan ink, magenta ink, yellow ink, and black ink). A color image is formed on the recording medium sheet M by sequentially ejecting the color inks from the cyan ink recording head 12C, the magenta ink recording head 12M, the yellow ink recording head 12Y, and the black ink recording head 12K.

The drying device 13 is provided downstream of the recording heads 12 in terms of the sheet conveyance direction. The drying device 13 dries the recording medium sheet M under conveyance by applying heat or blowing air, for example. Preferably, the conveyance section 1 preheats the recording medium sheet M while it is being conveyed. Combination of drying by the drying device 13 and preheating by the conveyance section 1 allows for quick drying of the undercoat liquid and the ink ejected onto the recording medium sheet M. Thus, the inkjet recording apparatus 100 can exhibit further excellent pinning property. The temperature for preheating is at least 40° C. and no greater than 60° C., for example. When drying the recording medium sheet M by applying heat using the drying device 13, the drying temperature is at least 80° C. and no greater than 120° C., for example.

One example of the inkjet recording apparatus of the present embodiment has been described so far. However, the inkjet recording apparatus of the present embodiment is not limited to that illustrated in FIG. 1. For example, with reference to FIG. 1, the inkjet recording apparatus 100 is described as an example that includes four recording heads corresponding to the four inks. However, the number of the recording heads included in the inkjet recording apparatus of the present embodiment is not limited as long as it is at least 2. It can range from at least 2 to no greater than 10, and preferably from at least 3 to no greater than 5.

The inkjet recording apparatus 100 ejects the inks in the four colors of cyan, magenta, yellow, and black in the stated order. However, the type, combination, and ejection order of the inks are not limited thereto.

Alternatively, the inkjet recording apparatus of the present embodiment may not include a heating section. The conveyance section may not perform the preheating.

The inkjet recording apparatus of the present embodiment may include an undercoat liquid ejection head and a recording head, each of which is of serial type. The inkjet recording apparatus of the present embodiment may be a multifunction peripheral having functions of a scanner, a copier, a printer, and a facsimile.

EXAMPLES

The following describes examples of the present disclosure. However, the present disclosure is not limited to the following examples.

[Pigment Dispersion Preparation]

Pigment dispersions with compositions shown in Table 3 were prepared by the following methods. Note that pigments for the colors shown in Table 3 are as follows.

White pigment: "JR-804", product of TAYCA CORPORATION, titanium oxide particles

Yellow pigment: "PALCOHOL YELLOW D1115J", product of BASF Japan

Cyan pigment: "HELIOGEN (registered Japanese trademark) Blue D7088", product of BASF Japan (Preparation of Resin A)

A resin A for obtaining a pigment coating resin (Resin A-Na) in Table 3 was prepared by the following method. In detail, a stirrer, a nitrogen inlet tube, a condenser, and a dropping funnel were set up in a four-necked flask. Next, 100 parts by mass of isopropyl alcohol and 300 parts by mass of methyl ethyl ketone were charged into the flask. Heating and refluxing were performed at 70° C. while bubbling nitrogen into the flask contents.

Next, a solution L1 was prepared. In detail, 40.0 parts by mass of styrene, 10.0 parts by mass of methacrylic acid, 40.0 parts by mass of methyl methacrylate, 10.0 parts by mass of butyl acrylate, and 0.4 parts by mass of azobisisobutyronitrile (AIBN, polymerization initiator) were mixed to obtain the solution L1 being a monomer solution. While the flask contents were heated and refluxed at 70° C., the solution L1 was dripped into the flask over 2 hours. After the dripping, the flask contents were heated and refluxed at 70° C. for additional 6 hours.

Next, a solution L2 was prepared. In detail, 0.2 parts by mass of AIBN and 150.0 parts by mass of methyl ethyl ketone were mixed to obtain the solution L2. The solution L2 was dripped into the flask over 15 minutes. After the dripping, the flask contents were heated and refluxed at 70° C. for additional 5 hours. As the manner described above, the resin A (styrene-(meth)acrylic resin) was obtained. The resulting resin A had a mass average molecular weight (Mw) of 20,000 and an acid value of 100 mgKOH/g.

Here, the mass average molecular weight Mw of the resin A was measured under the following conditions using a gel filtration chromatography ("HLC-8020GPC", product of Tosoh Corporation).

Column: "TSKGEL SUPER MULTIPORE HZ-H" produced by Tosoh Corporation (semi-micro column with 4.6 mm I.D.×15 cm)

Number of columns: 3

Eluent: tetrahydrofuran

Flow rate: 0.35 mL/min

Sample injection amount: 10 μL

Sample temperature: 40° C.

Detector: IR detector

A calibration curve was plotted using n-propylbenzene and TSKgel standard polystyrenes from Tosoh Corporation, including F-40, F-20, F-4, F-1, A-5000, A-2500, and A-1000.

The acid value of the resin A was measured by a method in accordance with the "Japanese Industrial Standards (JIS) K0070-1992 (Test methods for acid value, saponification value, ester value, iodine value, hydroxyl value and unsaponifiable matter of chemical products)".

(Preparation of White Pigment Dispersion)

An aqueous solution of sodium hydroxide in an amount necessary to neutralize the resin A was added to the resin A while the resin A was heated in a hot bath set at 70° C. More specifically, an aqueous solution of sodium hydroxide with a mass giving 1.1 times the neutralization equivalent was added to the resin A. Thus, an aqueous solution of the resin A (resin A-Na) neutralized with sodium hydroxide was obtained. The pH of the aqueous solution of the resin A-Na was 8.

To achieve the composition shown in Table 3, 6.0 parts by mass of the aqueous solution containing the resin A-Na, 50.0 parts by mass of the white pigment, 0.5 parts by mass of a surfactant ("OLFINE (registered Japanese trademark) E1010", product of Nissin Chemical Industry Co., Ltd, ethylene oxide adduct of acetylene glycol), and water were charged into the vessel of a media type disperser ("DYNO (registered Japanese trademark)-MILL", product of Willy A. Bachofen AG (WAB)). Thus, a mixed liquid was prepared. The amount of the water added was adjusted to bring the total amount of the mixed liquid to 100.0 parts by mass.

Next, the vessel was charged with a medium (zirconia beads with particle diameter of 1.0 mm) so that the filling rate of the medium was 70% by volume relative to the vessel's capacity. The mixed liquid (vessel contents) underwent a dispersion treatment using a media-type disperser. A white pigment dispersion was thus obtained.

(Preparation of Yellow Pigment Dispersion and Cyan Pigment Dispersion)

A yellow pigment dispersion and a cyan pigment dispersion were prepared by the same method as that for preparing the white pigment dispersion, except that the type and amount of each pigment were changed so as to achieve the compositions as shown in Table 3.

The white pigment dispersion, the yellow pigment dispersion, and the cyan pigment dispersion each were diluted 300 times with water to obtain a dilution. The dilutions were measured using a dynamic light scattering type particle size distribution analyzer ("ZETASIZER (registered Japanese trademark) NANO ZS", product of Malvern Instruments Ltd.) to determine the volume median diameter ($D_{50}$) of the pigment particles. Thereafter, it was confirmed that pigment particles with a volume median diameter in a range of at least 70 nm to no greater than 130 nm were dispersed in each of the pigment dispersions.

TABLE 3

|  | White pigment dispersion | Yellow pigment dispersion | Cyan pigment dispersion |
|---|---|---|---|
| White pigment | 50.0 | — | — |
| Yellow pigment | — | 15.0 | — |
| Cyan pigment | — | — | 15.0 |
| Pigment coating resin (resin A-Na) | 6.0 | 6.0 | 6.0 |
| Surfactant | 0.5 | 0.5 | 0.5 |
| Water | Rest | Rest | Rest |
| Total | 100.0 | 100.0 | 100.0 |

[Binder Resin Particle Dispersions]

Binder resin particle dispersions (A) to (E) as shown in Table 4 were prepared as the binder resin particle dispersions for use in examples. Table 4 shows, for each of the binder resin particle dispersion, the solid concentration (listed under "Concentration" in Table 4) of corresponding binder resin particles, details of binder resin particles in the binder resin particle dispersion, the breaking elongation, the volume median diameter (listed under "Diameter" in Table 4), and the glass transition point (Tg). Note that "(R)" in Table 4 refers to registered Japanese trademark. "SUPERFLEX (registered Japanese trademark)" in series is a product of DKS Co. Ltd. "ELITEL (registered Japanese trademark)" series is a product of UNITIKA LTD.

TABLE 4

|  | Product name | Resin particles | Breaking elongation [%] | Concentration [wt %] | Diameter [nm] | Tg [° C.] |
|---|---|---|---|---|---|---|
| A | SUPERFLEX (R) 860 | Urethane resin particles A | 3 | 40 | 200 | 38 |
| B | SUPERFLEX (R) 170 | Urethane resin particles B | 50 | 33 | 10 | 75 |
| C | SUPERFLEX (R) 870 | Urethane resin particles C | 4 | 30 | 30 | 78 |
| D | SUPERFLEX (R) 150 | Urethane resin particles D | 330 | 30 | 30 | 40 |
| E | ELITEL (R) KT-8803 | Polyester resin particles A | 10 | 30 | 80 | 65 |

19

<Ink Set Preparation>

Ink sets for Examples 1 to 9 and Comparative Examples 1 to 5 were prepared by the following methods.

Example 1

The ink set of Example 1 used was a combination of an undercoat liquid, a yellow ink (first ink), and a cyan ink (second ink) each prepared by the following methods.

(Undercoat Liquid Preparation)

A mixed liquid (I) was obtained by mixing: 23.2 parts by mass of the white pigment dispersion containing 11.6 parts by mass of the white pigment and 1.4 parts by mass of the pigment coating resin; 12.5 parts by mass of the binder resin particle dispersion (A) containing 5.0 parts by mass of urethane resin particles A; 8.0 parts by mass of triethylene glycol monobutyl ether; 0.3 parts by mass of a silicone surfactant ("SILFACE (registered Japanese trademark) SAG 503A", product of Nissin Chemical Industry Co., Ltd); and ion exchange water. The amount of the ion exchange water added was adjusted to bring the total amount of the mixed liquid (I) to 100.0 parts by mass.

The mixed liquid (I) was stirred at a rotational speed of 400 rpm using a stirrer ("THREE ONE MOTOR (registered Japanese trademark) BL-600", product of Shinto Scientific Co., Ltd.). Next, the mixed liquid (I) was filtered after the stirring using a filter with a pore size of 5 μm to remove foreign matter and coarse particles. Thus, an undercoat liquid (white ink) for use in the ink set of Example 1 was obtained, with a corresponding composition shown in Table 5.

(Yellow Ink Preparation)

A mixed liquid (II) was obtained by mixing: 14.3 parts by mass of the yellow pigment dispersion containing 2.1 parts by mass of the yellow pigment and 0.9 parts by mass of the pigment coating resin; 15.0 parts by mass of the binder resin particle dispersion (B) containing 5.0 parts by mass of urethane resin particles B; 20.0 parts by mass of propylene glycol, 8.0 parts by mass of triethylene glycol monobutyl ether; 0.3 parts by mass of a silicone surfactant ("SILFACE (registered Japanese trademark) SAG 503A", product of Nissin Chemical Industry Co., Ltd); and ion exchange water. The amount of the ion exchange water added was adjusted to bring the total amount of the mixed liquid (II) to 100.0 parts by mass.

The mixed liquid (II) was stirred at a rotational speed of 400 rpm using a stirrer ("THREE ONE MOTOR (registered Japanese trademark) BL-600", product of Shinto Scientific Co., Ltd.). Next, the mixed liquid (II) was filtered after the stirring using a filter with a pore size of 5 μm to remove foreign matter and coarse particles. Thus, a yellow ink (first ink) for use in the ink set of Example 1 was obtained, with a corresponding composition shown in Table 6.

(Cyan Ink Preparation)

A mixed liquid (III) was obtained by mixing: 14.3 parts by mass of the cyan pigment dispersion containing 2.1 parts by mass of the cyan pigment and 0.9 parts by mass of the pigment coating resin; 15.0 parts by mass of the binder resin particle dispersion (B) containing 5.0 parts by mass of the urethane resin particles B; 20.0 parts by mass of propylene glycol; 8.0 parts by mass of triethylene glycol monobutyl ether; 0.3 parts by mass of a silicone surfactant ("SILFACE (registered Japanese trademark) SAG 503A", product of Nissin Chemical Industry Co., Ltd); and ion exchange water. The amount of the ion exchange water added was adjusted to bring the total amount of the mixed liquid (III) to 100.0 parts by mass.

The mixed liquid (III) was stirred at a rotational speed of 400 rpm using a stirrer ("THREE ONE MOTOR (registered Japanese trademark) BL-600", product of Shinto Scientific Co., Ltd.). Next, the mixed liquid (III) was filtered after the stirring using a filter with a pore size of 5 μm to remove foreign matter and coarse particles. Thus, a cyan ink (second ink) for use in the ink set of Example 1 was obtained, with a corresponding composition shown in Table 7.

Examples 2 to 8 and Comparative Examples 1 to 5

Ink sets of Examples 2 to 8 and Comparative Examples 1 to 5 were prepared by the same methods as those for preparing the ink set of Example 1 except for the following changes. In the preparation of the ink sets of Examples 2 to 8 and Comparative Examples 1 to 5, the type and amount of each component used in the preparation of the yellow and the cyan inks were changed so that the inks had corresponding compositions shown in Tables 5 to 7. Note that Examples 3 to 6 and Comparative Examples 1, 2, and 5 used undercoat liquids (undercoat liquid other than ink) containing no white pigment.

TABLE 5

| | | Examples | | | | | | |
|---|---|---|---|---|---|---|---|---|
| Undercoat liquid | | 1 | 2 | 3 | 4 | 5 | 6 | 7 |
| Composition [% by mass] | White pigment | 11.6 | 11.6 | — | — | — | — | 11.6 |
| | Pigment coating resin | 1.4 | 1.4 | — | — | — | — | 1.4 |
| | Urethane resin particles A (breaking elongation 3%) | 5.0 | 5.0 | 15.0 | 15.0 | 11.0 | — | 5.0 |
| | Urethane resin particles B (breaking elongation 50%) | — | — | — | — | — | 15.0 | — |
| | Diethylene glycol monobutyl ether | — | — | — | — | — | — | 8.0 |

TABLE 5-continued

| | | | | | | | |
|---|---|---|---|---|---|---|---|
| Triethylene glycol monobutyl ether | 8.0 | 8.0 | 8.0 | 8.0 | 8.0 | 8.0 | — |
| Silicone surfactant | 0.3 | 0.3 | 0.3 | 0.3 | 0.3 | 0.3 | 0.3 |
| Ion exchange water | Rest | | | | | | |
| Total | 100.0 | | | | | | |
| Density [g/cm³] | 1.14 | 1.14 | 1.14 | 1.14 | 1.10 | 1.15 | 1.14 |

| | | Examples | | Comparative Examples | | | | |
|---|---|---|---|---|---|---|---|---|
| Undercoat liquid | | 8 | 9 | 1 | 2 | 3 | 4 | 5 |
| Composition [% by mass] | White pigment | 11.6 | 11.6 | — | — | 6.2 | 6.2 | — |
| | Pigment coating resin | 1.4 | 1.4 | — | — | 0.8 | 0.8 | — |
| | Urethane resin particles A (Breaking elongation 3%) | 5.0 | 5.0 | 5.0 | 9.0 | 5.0 | 3.0 | 5.0 |
| | Urethane resin particles B (Breaking elongation 50%) | — | — | — | — | — | — | — |
| | Diethylene glycol monobutyl ether | — | 8.0 | — | — | — | — | — |
| | Triethylene glycol monobutyl ether | 8.0 | — | 8.0 | 8.0 | 8.0 | 8.0 | 8.0 |
| | Silicone surfactant | 0.3 | 0.3 | 0.3 | 0.3 | 0.3 | 0.3 | 0.3 |
| | Ion exchange water | Rest | | | | | | |
| | Total | 100.0 | | | | | | |
| | Density [g/cm³] | 1.14 | 1.14 | 1.01 | 1.04 | 1.08 | 1.07 | 1.01 |

TABLE 6

| | | Examples | | | | | | |
|---|---|---|---|---|---|---|---|---|
| Yellow ink (first ink) | | 1 | 2 | 3 | 4 | 5 | 6 | 7 |
| Composition [% by mass] | Yellow pigment | 2.1 | 2.1 | 2.1 | 2.1 | 2.1 | 2.1 | 2.1 |
| | Pigment coating resin | 0.9 | 0.9 | 0.9 | 0.9 | 0.9 | 0.9 | 0.9 |
| | Urethane resin particles B (Breaking elongation 50%) | 5.0 | — | 5.0 | — | — | 5.0 | 5.0 |
| | Urethane resin particles C (Breaking elongation 4%) | — | 5.0 | — | 5.0 | 5.0 | — | — |
| | Urethane resin particles D (Breaking elongation 330%) | — | — | — | — | — | — | — |
| | Propylene glycol | 20.0 | 20.0 | 20.0 | 20.0 | 20.0 | 20.0 | 20.0 |
| | Triethylene glycol monobutyl ether | 8.0 | 8.0 | 8.0 | 8.0 | 8.0 | 8.0 | 8.0 |
| | 1,3-Propanediol | — | — | — | — | — | — | — |
| | 3-Methyl-1,3-butanediol | — | — | — | — | — | — | — |
| | Silicone surfactant | 0.3 | 0.3 | 0.3 | 0.3 | 0.3 | 0.3 | 0.3 |
| | Ion exchange water | Rest | | | | | | |
| | Total | 100.0 | | | | | | |
| | Density [g/cm³] | 1.04 | 1.04 | 1.04 | 1.04 | 1.04 | 1.04 | 1.04 |

TABLE 6-continued

| | | Examples | | Comparative Examples | | | | |
|---|---|---|---|---|---|---|---|---|
| Yellow ink (first ink) | | 8 | 9 | 1 | 2 | 3 | 4 | 5 |
| Composition [% by mass] | Yellow pigment | 2.1 | 2.1 | 2.1 | 2.1 | 2.1 | 2.1 | 2.1 |
| | Pigment coating resin | 0.9 | 0.9 | 0.9 | 0.9 | 0.9 | 0.9 | 0.9 |
| | Urethane resin particles B (breaking elongation 50%) | 5.0 | 5.0 | 5.0 | 5.0 | 5.0 | — | 5.0 |
| | Urethane resin particles C (breaking elongation 4%) | — | — | — | — | — | — | — |
| | Urethane resin particles D (breaking elongation 330%) | — | — | — | — | — | 5.0 | — |
| | Propylene glycol | — | 20.0 | 20.0 | 20.0 | 20.0 | 20.0 | 20.0 |
| | Triethylene glycol monobutyl ether | 8.0 | — | 8.0 | 8.0 | 8.0 | 8.0 | 8.0 |
| | 1,3-Propanediol | 20.0 | — | — | — | — | — | — |
| | 3-Methyl-1,3-butanediol | — | 8.0 | — | — | — | — | — |
| | Silicone surfactant | 0.3 | 0.3 | 0.3 | 0.3 | 0.3 | 0.3 | 0.3 |
| | Ion exchange water | | | | Rest | | | |
| | Total | | | | 100.0 | | | |
| | Density [g/cm$^3$] | 1.04 | 1.04 | 1.04 | 1.04 | 1.04 | 1.05 | 1.04 |

TABLE 7

| | | Examples | | | | | | |
|---|---|---|---|---|---|---|---|---|
| Cyan ink (second ink) | | 1 | 2 | 3 | 4 | 5 | 6 | 7 |
| Composition [% by mass] | Cyan pigment | 2.1 | 2.1 | 2.1 | 2.1 | 2.1 | 2.1 | 2.1 |
| | Pigment coating resin | 0.9 | 0.9 | 0.9 | 0.9 | 0.9 | 0.9 | 0.9 |
| | Urethane resin particles B (Breaking elongation 50%) | 5.0 | — | 5.0 | 5.0 | 5.0 | 5.0 | 5.0 |
| | Polyester resin particles A (Breaking elongation 10%) | — | 5.0 | — | — | — | — | — |
| | Propylene glycol | 20.0 | 20.0 | 20.0 | 20.0 | 20.0 | 20.0 | 20.0 |
| | Triethylene glycol monobutyl ether | 8.0 | 8.0 | 8.0 | 8.0 | 8.0 | 8.0 | 8.0 |
| | 1,3-Propanediol | — | — | — | — | — | — | — |
| | 3-Methyl-1,3-butanediol | — | — | — | — | — | — | — |
| | Silicone surfactant | 0.3 | 0.3 | 0.3 | 0.3 | 0.3 | 0.3 | 0.3 |
| | Ion exchange water | | | | Rest | | | |
| | Total | | | | 100.0 | | | |
| | Density [g/cm$^3$] | 1.04 | 1.04 | 1.04 | 1.04 | 1.04 | 1.04 | 1.04 |

| | | Examples | | Comparative Examples | | | | |
|---|---|---|---|---|---|---|---|---|
| Cyan ink (second ink) | | 8 | 9 | 1 | 2 | 3 | 4 | 5 |
| Composition [% by mass] | Cyan pigment | 2.1 | 2.1 | 2.1 | 2.1 | 2.1 | 2.1 | 2.1 |
| | Pigment coating resin | 0.9 | 0.9 | 0.9 | 0.9 | 0.9 | 0.9 | 0.9 |
| | Urethane resin particles B (breaking elongation 50%) | 5.0 | 5.0 | 5.0 | 5.0 | 5.0 | 5.0 | 5.0 |

TABLE 7-continued

| Polyester resin particles A (breaking elongation 10%) | — | — | — | — | — | — | — |
|---|---|---|---|---|---|---|---|
| Propylene glycol | — | — | 20.0 | 20.0 | 20.0 | 20.0 | 20.0 |
| Triethylene glycol monobutyl ether | — | 8.0 | 8.0 | 8.0 | 8.0 | 8.0 | 8.0 |
| 1,3-Propanediol | 20.0 | 20.0 | — | — | — | — | — |
| 3-Methyl-1,3-butanediol | 8.0 | — | — | — | — | — | — |
| Silicone surfactant | 0.3 | 0.3 | 0.3 | 0.3 | 0.3 | 0.3 | 0.3 |
| Ion exchange water | | | | Rest | | | |
| Total | | | | 100.0 | | | |
| Density [g/cm$^3$] | 1.04 | 1.04 | 1.04 | 1.04 | 1.04 | 1.05 | 1.04 |

<Evaluation>

Each of the ink sets of Examples 1 to 9 and Comparative Examples 1 to 5 were evaluated for pinning property and scratch resistance and adhesion of images formed on recording medium sheets. Evaluation results are shown in Table 8.

[Evaluation Apparatus]

An evaluation apparatus used was a textile printer ("MMP8130", product of Kabushiki Kaisha Mastermind). The evaluation apparatus was an inkjet recording apparatus that forms images with color inks and a white ink. The evaluation apparatus mainly included a white ink head (corresponding to the undercoat liquid ejection head) that ejects a white ink onto a recording medium, a plurality of color ink ejection heads (corresponding to the recording heads) that eject color inks onto the recording medium, and a conveyance section that conveys the recording medium. The white ink head was a circulation type head. The conveyance section included a mechanism for preheating while conveying the recording medium.

Each of the ink sets being an evaluation target was filled into the evaluation apparatus. In detail, any of the undercoat liquids shown in Tables 5 to 7 was filled into the undercoat liquid ejection head included in the evaluation apparatus. The color inks (yellow and cyan inks) shown in Tables 5 to 7 were filled into a corresponding one of the recording heads included in the evaluation apparatus.

The non-absorbent recording medium used was PET film ("FE2000", product of Futamura Chemical Co., Ltd., not subjected to surface treatment).

[Pinning Property]

In the evaluation of pinning property, the temperature for preheating by the conveyance section was set at 50° C. First, undercoating was performed by ejecting the undercoat liquid onto the entire surface of the PET film using the evaluation apparatus. Next, the yellow ink (first ink) was ejected onto the PET film by the evaluation apparatus to form a yellow stripe image constituted by multiple vertical lines with a line width of 5 dots. Next, the cyan ink (second ink) was ejected onto the PET film by the evaluation apparatus to form a cyan stripe image constituted by multiple horizontal lines with a line width of 5 dots. Thus, a lattice image (vertical lines: yellow ink, horizontal lines: cyan ink) was formed on the PET film. After a pre-drying time T (2 seconds or 180 seconds) shown in Table 8 has elapsed, the PET film was then dried for 5 minutes at 110° C. The lattice image was used as an evaluation image.

Figure 2:
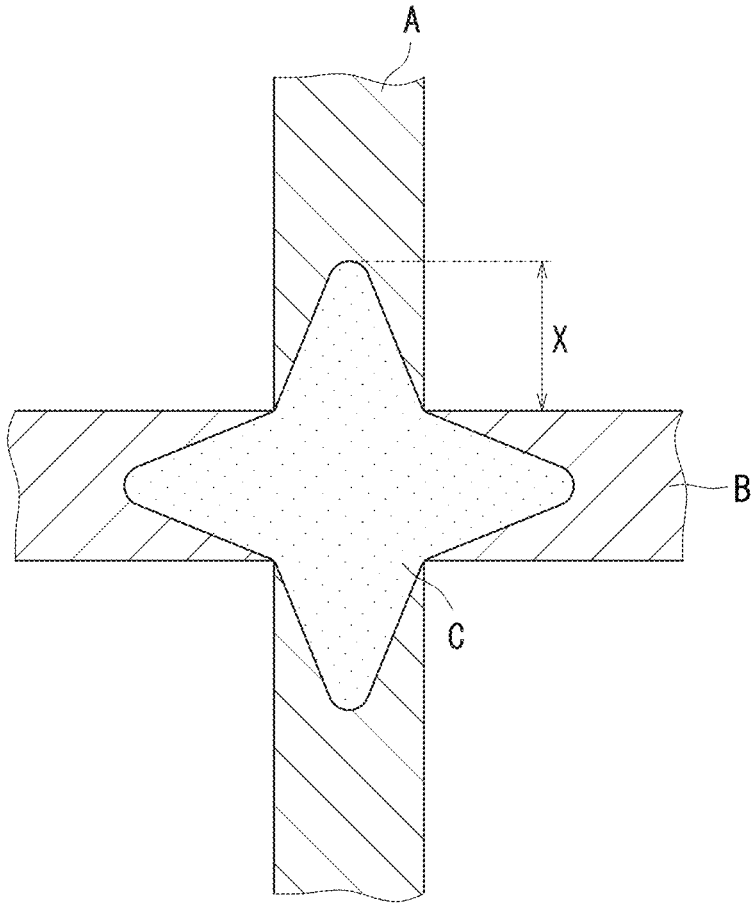
FIG. 2 is a diagram illustrating an evaluation image for evaluating pinning property in Examples according to the present disclosure.

For the evaluation of pinning property, the blurring at the intersections of the evaluation images was observed using an optical microscope. As illustrated in FIG. 2, the evaluation image included vertical lines A of yellow ink, horizontal lines B of cyan ink, and intersections of the vertical lines A and the horizontal lines B. Yellow and cyan inks mixed at the intersections, forming mixed-color parts C. The mixed-color parts C spread beyond the intersections and into the vertical lines A and horizontal lines B. The distance (the width) by which the mixed-color parts C bleed into the vertical lines A is taken as a bleed width X. An ink set with excellent pinning property, by which the mixed-color ink hardly bleeds, has a small bleed width X. Conversely, an ink set with poor pinning property, by which the mixed-color ink readily bleeds, has a large bleed width X. Pinning property of the ink set was determined according to the following criteria.

(Evaluation Criteria of Pinning Property)

A (very good): bleed width X of no greater than 50 μm

B (good): bleed width X of greater than 50 μm and less than 150 μm

C (poor): bleed width X of 150 μm or more

[Adhesion]

First, undercoating was performed by ejecting the undercoat liquid onto the entire surface of the recording medium (PET film) using the evaluation apparatus. Thereafter, the yellow ink (first ink) was ejected onto the recording medium using a recording head of the evaluation apparatus to form a yellow solid image (printing rate 100%). After a pre-drying time T (2 seconds or 180 seconds) has elapsed, the recording medium was dried for 20 minutes at 110° C. The recording medium was then allowed to stand for 24 hours. The recording medium after the standing was used as an evaluation sheet (PET film).

The evaluation sheet was subjected to a cross-cut test in accordance with the Japanese Industrial Standards (JIS) K5600-5-6:1999. Specifically, 6 vertical incisions and 6 horizontal incisions were made at 2 mm intervals in a lattice pattern (checkerboard pattern) on the solid image on the evaluation sheet. This resulted in formation of 25 square cells, each with a side length of 2 mm. Adhesive tape ("CELLOTAPE (registered Japanese trademark) CT-18S", product of Nichiban Co., Ltd.) was applied onto the yellow solid image on the evaluation sheet and peeled off at an angle of approximately 60 degrees. The adhesive tape was peeled at a speed such that the time from the start of peeling to its completion was 1 second. After the peeling off of the adhesive tape, the yellow solid image on the evaluation sheet was visually observed to confirm whether it had been removed or not. A rate (peel rate [% by area]) of a part of the solid yellow image that had been peeled off along with the adhesive tape was calculated given that the rate of the area of the yellow solid image where the adhesive tape had been applied was 100%. Adhesion of the formed image to the recording medium sheet was determined according to the following criteria.

(Evaluation Criteria of Adhesion)

A (very good): image not peeled at all (peel rate: 0% by area).

B (good): peel rate of greater than 0% by area and less than 80% by area.

C (poor): peel rate of 80% by area or more.

[Scratch Resistance]

An evaluation sheet (PET film) was prepared by the same method as that in the adhesion evaluation. Copy paper ("CC90", product of Mondi plc) (also referred to below as evaluation paper) was placed on the evaluation sheet. Next, a rectangular solid weight (mass 1 kg) with a base dimension of 5 cm×4 cm was placed on the evaluation paper. The weight was placed at a position directly above the solid yellow image. Next, the evaluation paper was moved horizontally with its opposite ends held. The weight was moved horizontally back and forth 5 times above the yellow solid image. As a result, the yellow solid image was rubbed by the evaluation paper with a load of 1 kg. Thereafter, the image density of the area of the evaluation paper in contact with the solid yellow image was measured using a reflectance densitometer ("FD-9", product of KONICA MINOLTA JAPAN, INC.). The measurement conditions included an observation light source of "D50", an illumination condition of "M2", a field of view of "2°", and a density status of "I". In the measurement, the image density of the area on the evaluation paper that has been out of contact with the yellow solid image was used as the background value. The value (FD value) obtained by subtracting the background value from the measured image density was taken as the evaluation value for scratch resistance. Scratch resistance was determined according to the following criteria.

(Evaluation Criteria of Scratch Resistance)

A (good): FD value of less than 0.02.

B (poor): FD value of 0.02 or more.

TABLE 8

| | Examples | | | | | | |
|---|---|---|---|---|---|---|---|
| | 1 | 2 | 3 | 4 | 5 | 6 | 7 |
| $\rho 1-\rho 2$ | 0.10 | 0.10 | 0.10 | 0.10 | 0.06 | 0.11 | 0.10 |
| Pre-drying time T | 2 | 2 | 2 | 2 | 2 | 2 | 2 |
| Pinning property | A | A | A | A | A | B | A |
| Adhesion | A | A | A | A | A | A | A |
| Scratch resistance | A | A | A | A | A | A | A |

| | Examples | | Comparative Examples | | | | |
|---|---|---|---|---|---|---|---|
| | 8 | 9 | 1 | 2 | 3 | 4 | 5 |
| $\rho 1-\rho 2$ | 0.10 | 0.10 | −0.03 | 0.00 | 0.04 | 0.02 | −0.03 |
| Pre-drying time T | 2 | 2 | 2 | 2 | 2 | 2 | 180 |
| Pinning property | A | A | C | C | C | C | C |
| Adhesion | A | A | A | A | A | A | A |
| Scratch resistance | A | A | A | A | A | B | A |

As shown in Tables 3 to 8, the ink sets of Examples 1 to 9 each included an undercoat liquid and one or more inks. The undercoat liquid contained first binder resin particles, a first aqueous medium, and a first surfactant. Each of the one or more inks contained a second pigment, second binder resin particles, a second aqueous medium, and a second surfactant. At a temperature of 20° C., the density ρ1 of the undercoat liquid and the density ρ2 of an ink of the inks that had the highest density among those of the inks satisfied a relationship represented by formula (1) below:

$$\rho 1 - \rho 2 > 0.05 \text{ g/cm}^3 \tag{1}$$

The ink sets of Examples 1 to 8 exhibited excellent pinning property. The ink sets of Examples 1 to 8 also formed images with excellent scratch resistance and adhesion to the recording medium.

By contrast, the ink sets of Comparative Examples 1 to 5 did not satisfy formula (1). Therefore, the ink sets of Comparative Examples 1 to 5 exhibited poor pinning property. In addition, the ink sets of Comparative Examples 1 to 5 formed images with poor scratch resistance.

What is claimed is:

1. An inkjet ink set comprising:
an undercoat liquid; and
one or more inkjet inks, wherein
the undercoat liquid contains first binder resin particles, a first aqueous medium, and a first surfactant,
the one or more inkjet inks each contain a second pigment, second binder resin particles, a second aqueous medium, and a second surfactant,
at a temperature of 20° C., a density ρ1 of the undercoat liquid and a density ρ2 of an inkjet ink of the one or more inkjet ink that has highest density among those of the one or more inkjet inks satisfy a relationship represented by formula (1) below:

$$\rho 1 - \rho 2 > 0.05 \text{ g/cm}^3, \tag{1}$$

the density ρ1 of the undercoat liquid is at least 1.10 g/cm³ and no greater than 1.20 g/cm³.

2. The inkjet ink set according to claim 1, wherein the first binder resin particles have a volume median diameter of at least 100 nm and no greater than 250 nm.

3. The inkjet ink set according to claim 1, wherein the density ρ2 of the inkjet ink of the inkjet inks that has the highest density among those of the one or more inkjet inks is at least 1.00 g/cm³ and no greater than 1.09 g/cm³.

4. The inkjet ink set according to claim 1, wherein the first binder resin particles include urethane resin particles.

5. The inkjet ink set according to claim 1, wherein the inkjet ink set is used to print on a non-absorbent recording medium.

6. The inkjet ink set according to claim 1, wherein the inkjet ink set is used in front printing.

7. The inkjet ink set according to claim 1, wherein the first surfactant and the second surfactant both include a silicone surfactant.

8. An inkjet recording apparatus comprising:
the inkjet ink set according to claim 1;
a conveyance section that conveys a recording medium;
an undercoat liquid ejection head that ejects the undercoat liquid onto the recording medium; and
one or more recording heads that are placed downstream of the undercoat liquid ejection head in terms of a conveyance direction of the recording medium and that eject the respective one or more inkjet inks onto at least a part of an area of the recording medium, the area being an area of the recording medium onto which the undercoat liquid has been ejected.

9. The inkjet recording apparatus according to claim 8, wherein the undercoat liquid ejection head is a circulation type head.

10. The inkjet recording apparatus according to claim 8, further comprising a drying device that is provided downstream of the one or more recording heads in terms of the conveyance direction of the recording medium and that dries the recording medium, wherein the conveyance section preheats while conveying the recording medium.

11. The inkjet ink set according to claim 1, wherein the undercoat liquid further contains a first pigment, a total percentage content of the first pigment and the first binder resin particles being at least 12.0% by mass and no greater than 20.0% by mass in the undercoat liquid, the first aqueous medium contains water and a water-soluble organic solvent, a percentage content of the water being at least 70.0% by mass and no greater than 78.0% by mass in the undercoat liquid, and a percentage content of the water-soluble organic solvent being at least 5.0% by mass and no greater than 10.0% by mass in the undercoat liquid.

12. An inkjet ink set comprising:

an undercoat liquid; and one or more inkjet inks, wherein the undercoat liquid contains first binder resin particles, a first aqueous medium, and a first surfactant, the one or more inkjet inks each contain a second pigment, second binder resin particles, a second aqueous medium, and a second surfactant, at a temperature of 20° C., a density ρ1 of the undercoat liquid and a density ρ2 of an inkjet ink of the one or more inkjet ink that has highest density among those of the one or more inkjet inks satisfy a relationship represented by formula (1) below:

$$\rho 1 - \rho 2 > 0.05 \ g/cm^3 \qquad \qquad (1), \text{and}$$

the undercoat liquid further contains a first pigment, a total percentage content of the first pigment and the first binder resin particles being at least 12.0% by mass and no greater than 20.0% by mass in the undercoat liquid, of the undercoat liquid does not contain the first pigment, the first binder resin particles having a percentage content of at least 10.0% by mass and no greater than 18.0% by mass in the undercoat liquid.

13. An inkjet ink set comprising:

an undercoat liquid; and one or more inkjet inks, wherein the undercoat liquid contains first binder resin particles, a first aqueous medium, and a first surfactant, the one or more inkjet inks each contain a second pigment, second binder resin particles, a second aqueous medium, and a second surfactant, at a temperature of 20° C., a density ρ1 of the undercoat liquid and a density ρ2 of an inkjet ink of the one or more inkjet ink that has highest density among those of the one or more inkjet inks satisfy a relationship represented by formula (1) below:

$$\rho 1 - \rho 2 > 0.05 \ g/cm^3 \qquad \qquad (1),$$

the second binder resin particles include particles of at least one of urethane resin and polyester resin, and the second binder resin particles have a breaking elongation of no greater than 60%.

* * * * *